United States Patent [19]

Wenner et al.

[11] Patent Number: 5,456,357
[45] Date of Patent: Oct. 10, 1995

[54] NESTABLE BUCKET AND CARRIER

[76] Inventors: John W. Wenner; Joan L. Wenner, both of 1016 N. Kenilworth Ave., Glendale, Calif. 91202

[21] Appl. No.: 272,761

[22] Filed: Jul. 7, 1994

[51] Int. Cl.⁶ .................................................. B65D 25/00
[52] U.S. Cl. ...................... 206/372; 206/373; 206/514; 220/23.83; 220/529
[58] Field of Search .................................. 206/372, 373, 206/223, 576, 315.11, 499, 505, 507, 514, 518, 519; 220/23.83, 23.86, 531, 529

[56] References Cited

U.S. PATENT DOCUMENTS

| | | | |
|---|---|---|---|
| 3,966,102 | 6/1976 | Clark | 220/23.83 |
| 4,619,363 | 10/1986 | Wolfseder | 206/373 |
| 4,653,638 | 3/1987 | Lackner et al. | 206/373 |
| 4,714,158 | 12/1987 | Oltman et al. | 206/373 X |
| 4,807,776 | 2/1989 | Cortopassi | 220/23.83 |
| 5,086,917 | 2/1992 | Dziersk et al. | 206/514 X |
| 5,199,571 | 4/1993 | Wolff et al. | 206/518 |
| 5,303,500 | 4/1994 | Luukonen | 220/23.83 X |

*Primary Examiner*—Jacob K. Ackun

[57] ABSTRACT

A nestable bucket and carrier servingh as a caddy for assisting in cleaning motor vehicles and other objects include a sturdy rectangular bottom carrier of molded plastic materials having tapered sides, ventilating holes in the sides, sturdy legs which extend vertically from the top of the carrier to provide with support of the carrier and also bins or shelves attached to its external surfaces. Nesting within the carrier is a rectangular plastic bucket for holding liquids and which includes latch devices for fastening to the bottom carrier. A sturdy bail is fastened to the rim of the bucket. A top container is also generally rectangular in cross section and is configured to rest within the bucket or, if the bucket is removed, within the bottom carrier. The top container is also of molded plastic and includes a sturdy lid which can be opened to store cleaning supplies in the container or, when closed, may be used as a seat or step stool. It also includes latch devices to secure itself to either the bucket or the bottom carrier and ventilating holes in its sides and also seat lid to minimize formation of mildew within the carrier.

12 Claims, 4 Drawing Sheets

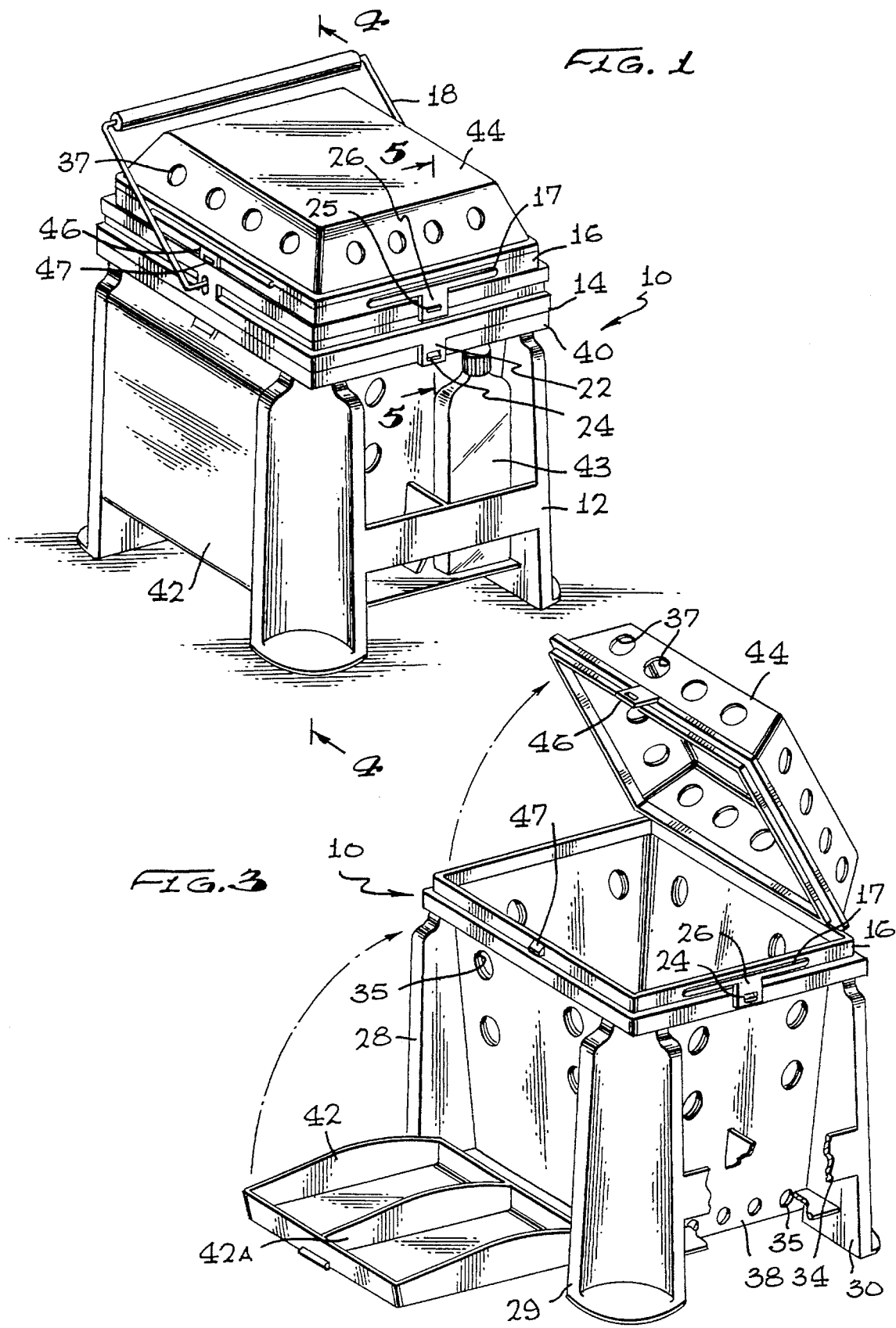

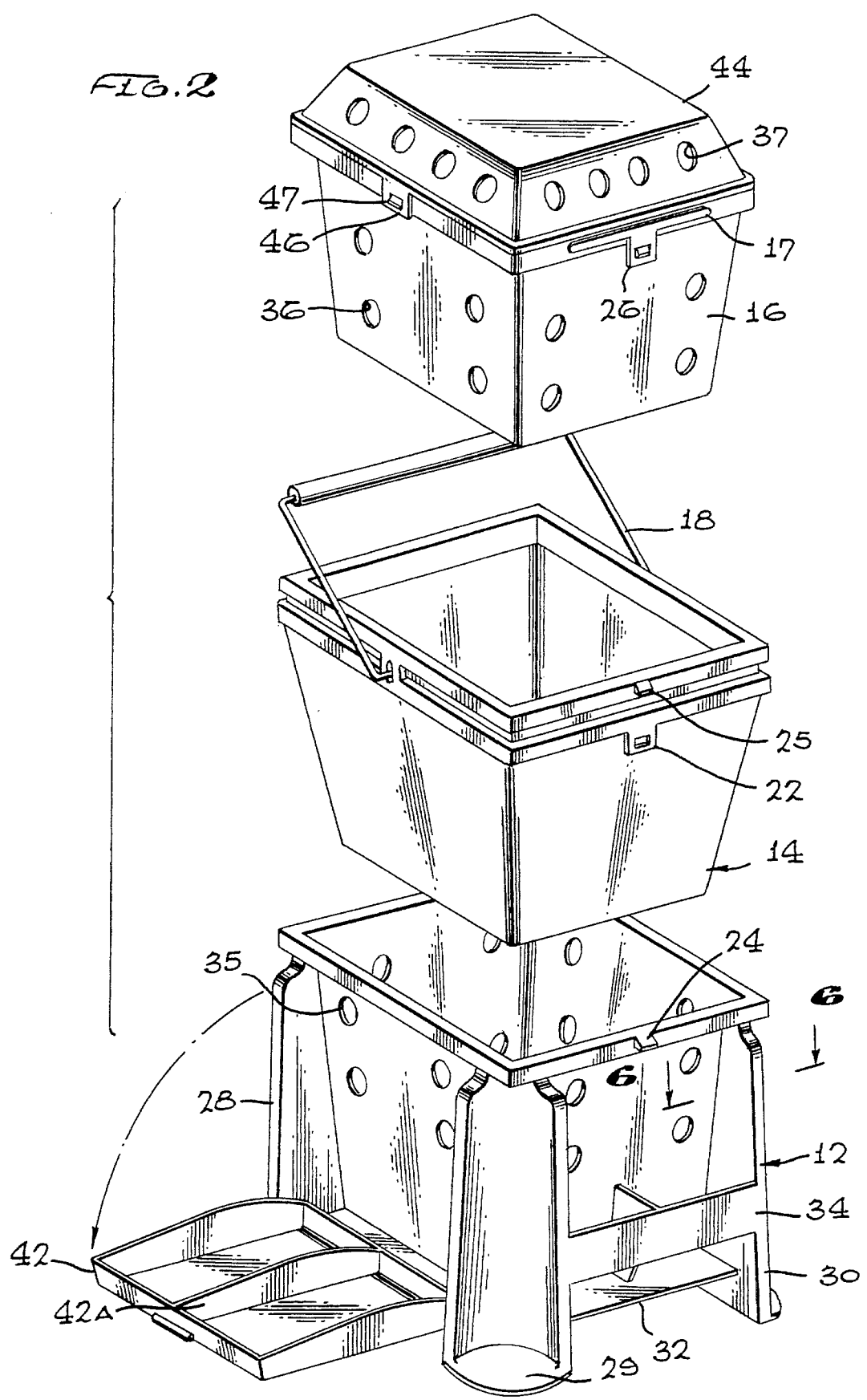

NESTABLE BUCKET AND CARRIER

BACKGROUND OF THE INVENTION

This invention relates to carrying caddies and more particularly to a nestable bucket and carrier having particular advantages for storing cleaning supplies for washing and waxing motor vehicles and other objects.

Applicants have been aware of certain specialized caddy designs, none of which are particularly adapted as an aid in washing and waxing motor vehicles and for storing the supplies used for this purpose.

A nestable container including a canister-type vacuum cleaner is described in U.S. Pat. No. 5,095,579. A particular advantage claimed for this invention is that the cleaning supplies are so contained as to prevent access thereto by small children. The strecture would apparently be expensive to produce.

Another cleaning supplies caddy is shown in U.S. Pat. No. 5,035,321 in which cleaning supplies are carried in a covered container and which includes means for dispensing paper towels.

The carrier shown in U.S. Pat. No. 3,759,356 is particularly adapted for dealing with the requirements of infants and includes compartments for clean diapers and food and a separate compartment with a pail for soiled diapers.

It appeared to applicants that there is a need for a caddy which is particularly useful for individuals who prefer to wash and wax their vehicles at home. Almost anyone having a car and a desire to clean and/or wax it finds that the cleaning supplies tend to become scattered in various locations in the garage, kitchen or the laundry. Another aspect of cleaning and waxing automobiles or trucks is that many of the surfaces which require attention are located either too high to reach comfortably such as the tops of vans or pick-ups or at a low elevation requiring that one stoop or squat in rather uncomfortable positions to reach wheels, bumpers and various underbody parts. None of the caddies of which applicants are aware incorporate a stool or a seat for providing convenient access to such body parts.

BRIEF DESCRIPTION OF THE INVENTION

Applicants have devised a caddy which includes three nestable components. The bottom carrier includes a tapered box with ventilated sides and strong supporting legs and exterior racks and/or bins for storage of containers for materials such as wax, chrome cleaner, car wash detergent, white sidewall cleaner, etc. Nesting in this bottom carrier is a pail or bucket which includes a handle or bail for carrying either the bucket itself or the entire assembly which fastens together. A third or top container which nests in the bucket has ventilated sides and also seat lid and may be used to contain sponges, wiping cloths, etc. and includes a sturdy cover or lid which is hinged at one side. This lid also serves as a seat or platform when the caddy is used as a stool.

Each of the three nesting units described above is preferably molded in a strong, somewhat flexible, plastic material such as 'olyethylene or polypropylene. The hinge on the lid of the top container and part of the fastener may be molded to the lid member. The fastener members may also be separable and fastened to the caddy components by conventional means such as screws or rivets. The fastener members are arranged such that fastener members on the bucket and the lid are identical and vertically aligned so that the movable latch members on the bucket and top container may engage the catch members on either the bucket or the bottom carrier. With this arrangement, the entire assembly may be stored or carried by means of the handle on the bucket, or the bucket may be removed for use and the lid and top container fastened to the bottom carrier, rendering the remaining parts useful both as a carrier caddy and as a seat or stool.

BRIEF DESCRIPTION OF THE DRAWING

This invention may be more clearly understood with the following detailed description and by reference to the drawings in which:

FIG. 1 is a perspective view of the complete caddy with all parts nested together;

FIG. 2 is an exploded view of the complete caddy with the main components shown separated;

FIG. 3 is a perspective view of the bottom carrier with the top container latched in position and with the lid of the top container shown open;

DETAILED DESCRIPTION OF THE INVENTION

Figure 4:
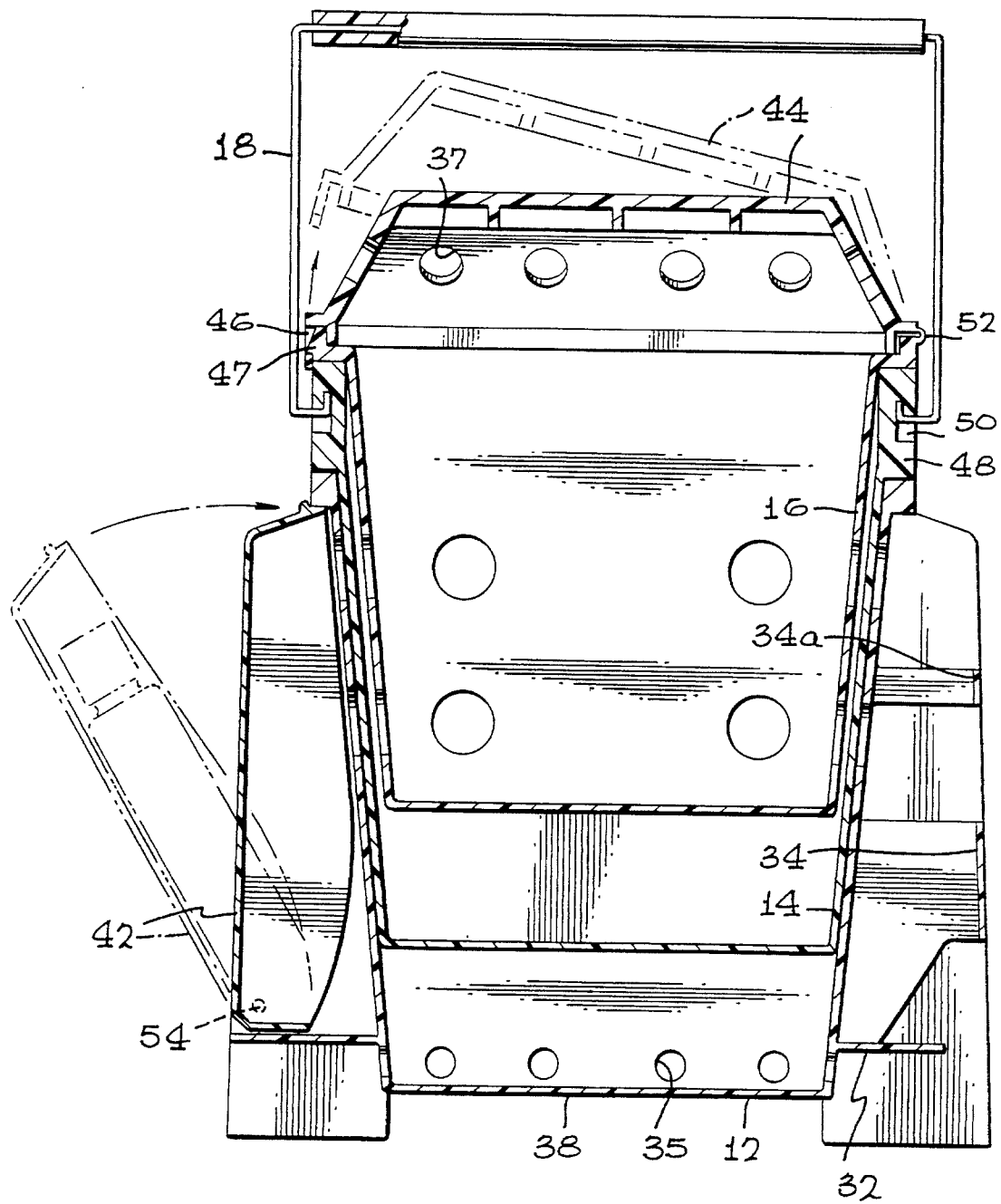
FIG. 4 is a sectional view taken along line 4—4 of FIG. 1.

FIG. 1 is a perspective view of the caddy 10 showing the bottom carrier 12, the bucket 14 and the top container 16 nested together. In this view, the top edge of bucket 14 is shown including the bail 18. Latch 22 is shown attached to catch member 24 which is secured to or molded into a rim 40 of bottom carrier 12. Fastened to the side of the bottom carrier and visible in this view is a pivotable bin 42, which is hinged at the bottom and includes an adjustable divider 42A. Bottom carrier 12 may be fashioned with one or more such bins or it may have shelves and rails such as shelf 32 and rail 34 on any of its four sides.

Latch 26 of top container 16 is shown latched to catch 25 in a rim of bucket 14. On the same side of top container 16 as latch 26 is a hand-hold groove 17. A plurality of ventilating holes 37 are also present in the lid 44 of top container 16, which lid should be made strong enough to serve as a seat or a step stool. Another latch 46, 47 similar to members 25 and 26 is molded into the lid and base of top container 16 to secure the lid in closed position.

FIG. 2 is an exploded view of a complete caddy 10 according to my invention including bottom carrier 12, bucket 14 which nests within bottom carrier member 12, and top container 16 which nests within bucket 14. The bucket 14 includes a bail 18 and a latch member 22 which cooperates with a catch 24 to secure bucket 14 to the bottom carrier 12. A similar latch member and catch are located at the back of the caddy (not shown) so that the bucket is secured to the bottom carrier by means of two latches. The top container 16 carries a similar latch member 26 which cooperates with catch 24 to fasten container 16 to bottom carrier 12 when the bucket 14 is removed from the caddy. Top container 16 also has a latch member at the back for fastening to the bottom carrier 12 so that components 12 and 16 are secured together by means of two separate fasteners. When bucket 14 is removed, a pair of handholds 17, only one of which is visible in this view, may be used as an aid in holding and carrying members 12 and 16.

All of caddy members 12, 14 and 16 are formed of a strong, but somewhat resilient plastic material which is readily formed with conventional molding processes.

The bottom carrier 12 includes four legs, three of which are shown at numerals 28, 29, and 30 in FIG. 2. The legs extend outwardly a significant distance from the sides of bottom carrier 12. At the bottom of bottom carrier 12 and supported a small distance above the bottom of legs 28 and 30 are a plurality of shelves 32 (one such shelf 32 appears on FIG. 2) which extend between and are supported at their ends by the legs. Also carried on the legs 29 and 30 and extending therebetween are rail members 34 (only one of which is shown on FIG. 2) which cooperate with shelf 32 to provide carrying means for various supplies. A bottle 43 is shown in FIG. 1 supported on shelf 32 which could, for example, be car wax or cleaner. Ventilating holes 35 are provided in the sides of bottom carrier 12, as shown in FIG. 3, as well as in an extended bottom section 38 which provides for air circulation between bucket 14 and the sides and bottom of bottom carrier 12. Similar ventilating holes 36 are formed in the sides of the top container 16.

FIG. 3 is a perspective view showing how components 12 and 16 nest together. Latch 26 is shown fastened onto catch member 24, securing members 12 and 16 together. Lid 44 of top container 16 is shown open and latch 46 and catch member 47 are shown. Rail 34 is shown broken away to show ventilating ports 35.

FIG. 4 is a sectional view taken along line 4—4 of FIG. 1. It is a view of the three members 12, 14 and 16 nested together. The lower part 38 of bottom carrier 12 is shown including ventilating ports 35. It will be observed that there is a significant space between the bottom of bucket 14 and the bottom carrier 12 so that certain articles such as damp sponges, etc., may be stored without concern about mildew. At the top of bucket 14 is a double rim structure 48 which includes a groove 50 in which the bail 1( is anchored. Lid 44 is attached to top carrier 16 by means of a molded hinge 52 although other hinge means could also be used.

The bin 42 is shown with a pivot at pin 54. This bin will normally be closed as shown in solid outline and is held closed firmly against the side of member 12 its weight and/or by the weight of its contents. In this view the bin 42 is shown in open position in phantom carrying a bottle. Rail 34 for shelf 32 is shown in section and a second rail 34a may be included, if desired.

Figure 5:
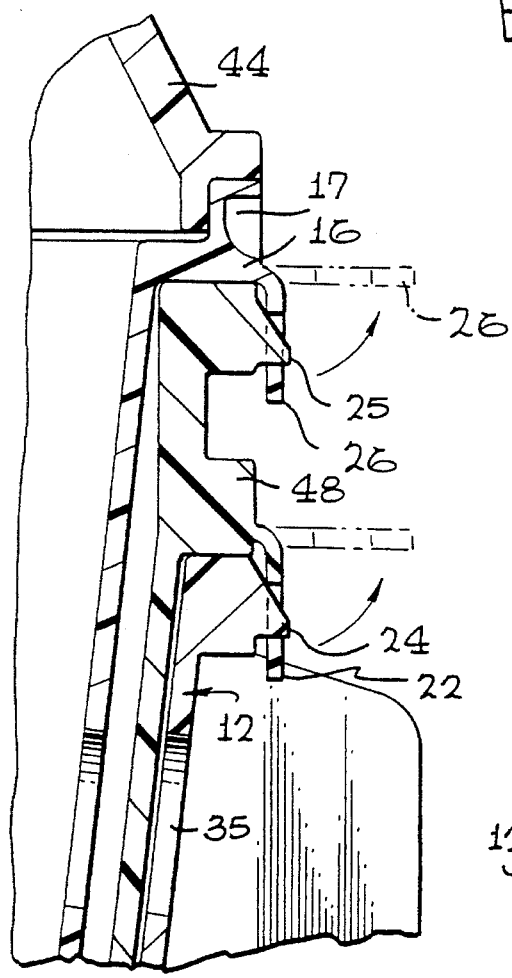
FIG. 5 is a sectional view taken along line 5—5 of FIG. 1.

FIG. 5 is a sectional drawing taken along line 5—5 of FIG. 1 and shows details of the latches used to fasten members 12, 14 and 16 together. Latch 26 of top container 16 is molded into a rim of top container 16 which rim also has molded therein hand-hold 17. Latch 26 is shown fastened over catch 25 on bucket 14. Catch 25 and latch 22 are molded into the double rim 48 of bucket 14. Latch 22 fastens over catch 24 of bottom carrier 12. Each of latches 22 and 26 are simply pulled outwardly as shown by the arrows to release catches 24 and 25, respectively.

Figure 6:
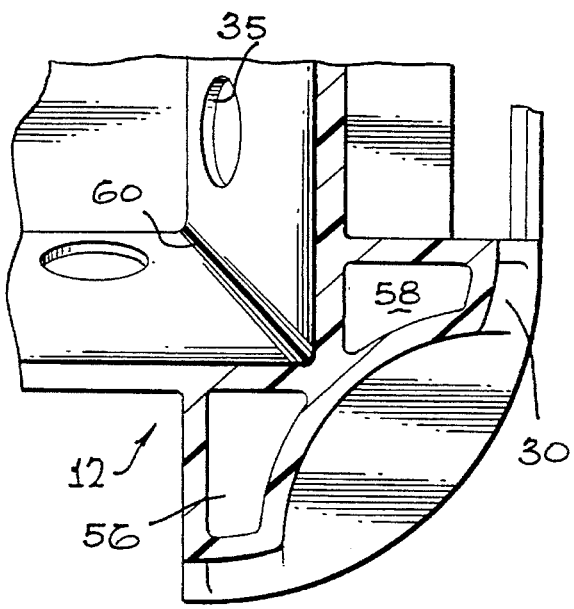
FIG. 6 is a sectional view taken along line 6—6 of FIG. 2.

FIG. 6 is a sectional view taken through line 6—6 of FIG. 2 and shows details of the structure of one of the legs forming part of bottom carrier 12; in this case, leg 30. It will be seen that these legs are formed with a concave curve (as viewed from the outside) and terminate at the bottom in an essentially flat pedestal. Two relatively strong buttress members comprising boxlike structures 56 and 58 appear at each outside edge of each leg which support both the leg and the corner 60 of bottom carrier 12.

Figure 7:
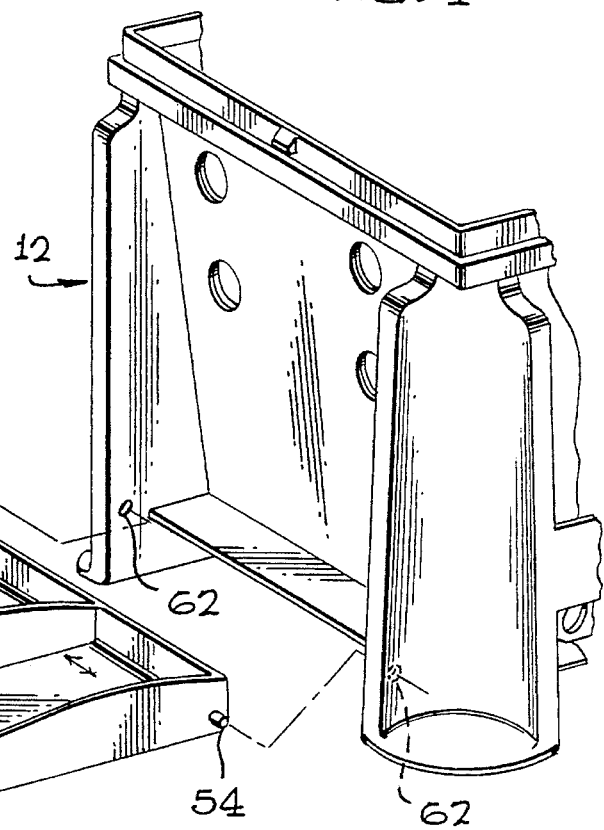
FIG. 7 shows a fragmentary portion of the bottom carrier with a pivotable bin removed to show its method of attachment.

FIG. 7 shows a fragmentary portion of the bottom carrier 12 with the bin 42 detached from carrier 12 and with pins 54 shown separated from their mounting holes 62. The dash-dot lines show where pins 54 fit in holes 62. Divider 42A extends between the top and bottom walls of bin 42 and is adjustable as indicated by the arrows to accommodate different sized containers.

The above-described embodiment of the present invention is merely descriptive of its principles and is not to be considered limiting. Those skilled in the art will recognize that the latch means employed may vary substantially from those shown. Obviously, the latches may reach upwardly to catches on the nested components rather than downwardly, as shown. While molded plastic latches would appear to be the most economic choice, other latch devices could be used. The rectangular configuration appears to be the most practiced to provide support for the shelves, etc. but other shapes can be employed within the spirit and scope of the invention. The scope of the present invention instead shall be determined from the scope of the following claims including their equivalents.

What is claimed is:

1. A nestable bucket and carrier comprising:

a generally rectangular carrier member having tapered sides, legs at its corners and receptacle holding means on the outside of said sides;

a generally rectangular bucket having tapered sides and adapted to nest in said rectangular carrier member;

means removably securing said bucket to said rectangular carrier member; and a generally rectangular top container having tapered sides and adapted to nest in said bucket, said top container having a lid incorporating a seat and means for securing said top container to said carrier member.

2. A nestable bucket and carrier as claimed in claim 1 wherein said receptacle holding means includes at least one bin pivotally attached near the bottom of said carrier member.

3. A nestable bucket and carrier in accordance with claim 1 wherein said carrier member includes shelf members extending outwardly from said tapered sides; and said legs include buttress members extend outwardly from said corners, the ends of said shelf members being attached to said legs.

4. A nestable bucket and carrier in accordance with claim 3 wherein railing means extend between at least two of said buttress members.

5. A nestable bucket and carrier as claimed in claim 1 wherein said carrier member includes at least one bin pivotally attached near the bottom of said carrier member.

6. A nestable bucket and carrier comprising:

a generally rectangular bucket capable of holding liquids having tapered sides and a bail attached to two of said sides near the top thereof;

a first generally rectangular container having tapered sides adapted to nest within said bucket, said container having a lid with a closable opening, and means securing said top to said bucket;

a carrier member having tapered sides and dimensioned such that said bucket fits within said carrier member, receptacle holding means on the outside of said carrier member; and means securing said bucket to said carrier member.

7. A nestable bucket and carrier as claimed in claim 6 wherein said lid of said first generally rectangular container comprises a seat.

8. A nestable bucket and carrier as claimed in claim 6 wherein said receptacle holding means includes external shelves.

9. A nestable bucket and carrier in accordance with claim 6 wherein said top container includes an openable lid for gaining access to the interior of said first generally rectangular container.

10. A nestable bucket and carrier in accordance with claim 6 wherein said first generally rectangular container includes ventilating ports through said tapered sides.

11. A nestable bucket and carrier in accordance with claim 6 wherein said carrier member includes at least one bin pivotally attached near the bottom of said rectangular container and latched near the top of said rectangular container.

12. A nestable bucket and carrier as claimed in claim 6 wherein said means removably fastening said bucket to said carrier member includes matching aligned catch members on said carrier and said bucket and matching aligned latches on said bucket and said top carrier.

* * * * *